Sept. 8, 1936.　　　　E. H. ARNOLD　　　　2,053,648
METHOD OF MANUFACTURING METAL VEHICLE WHEELS
Filed April 29, 1933　　　3 Sheets-Sheet 1

Inventor
ERNEST H ARNOLD
By Frank D. Gray
Attorney

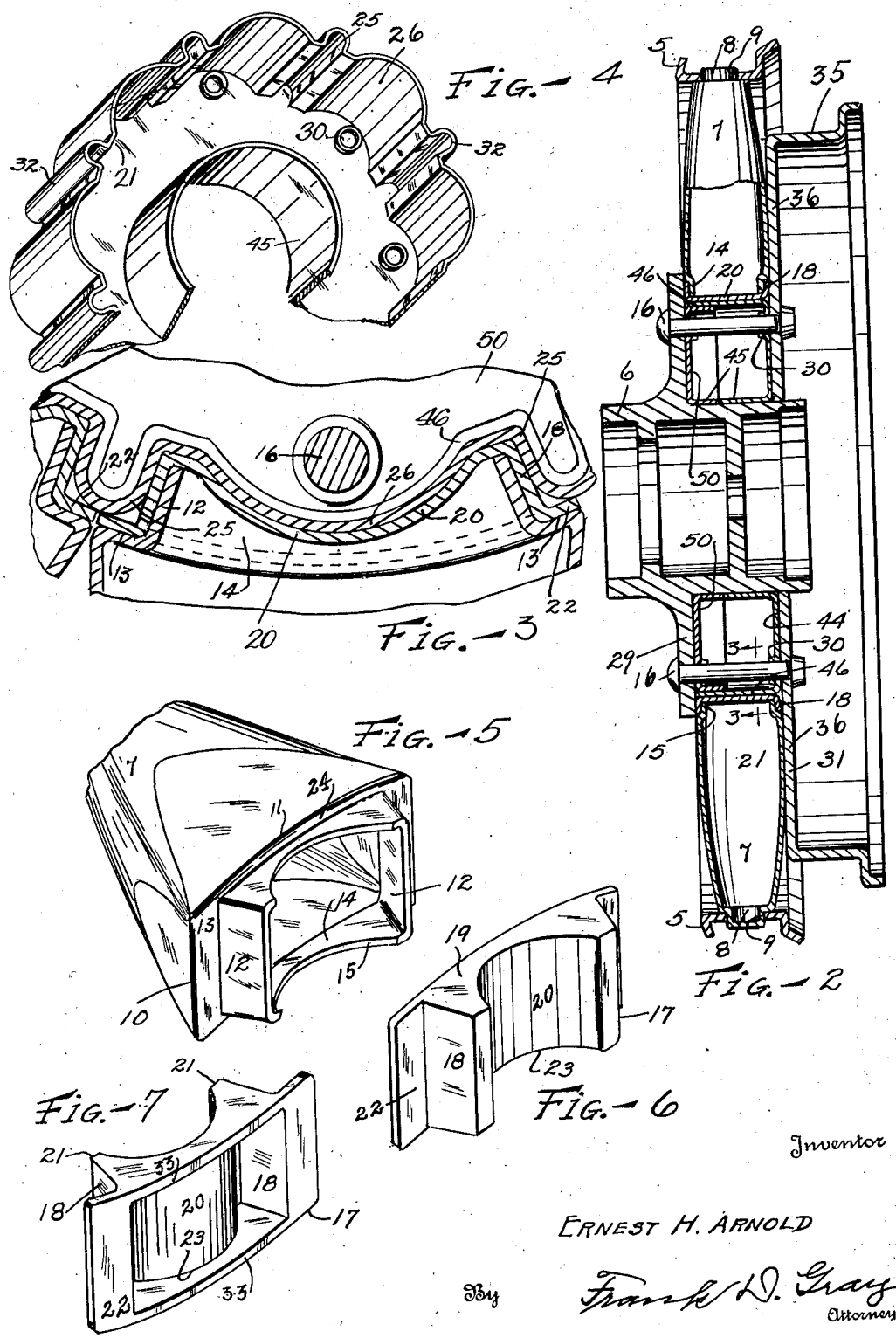
Sept. 8, 1936.   E. H. ARNOLD   2,053,648
METHOD OF MANUFACTURING METAL VEHICLE WHEELS
Filed April 29, 1933   3 Sheets-Sheet 2
Inventor
ERNEST H. ARNOLD
By Frank D. Gray
Attorney Sept. 8, 1936.  E. H. ARNOLD  2,053,648
METHOD OF MANUFACTURING METAL VEHICLE WHEELS
Filed April 29, 1933  3 Sheets-Sheet 3
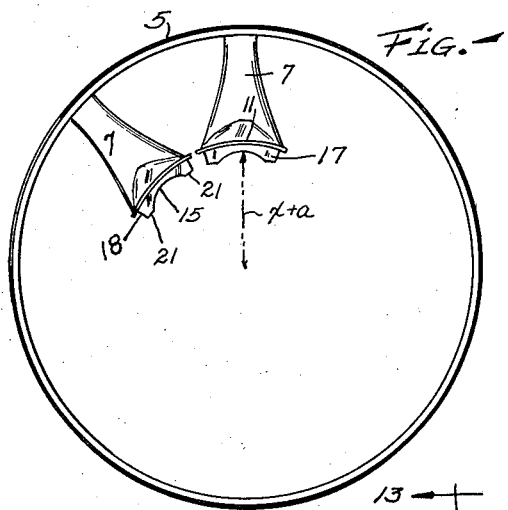
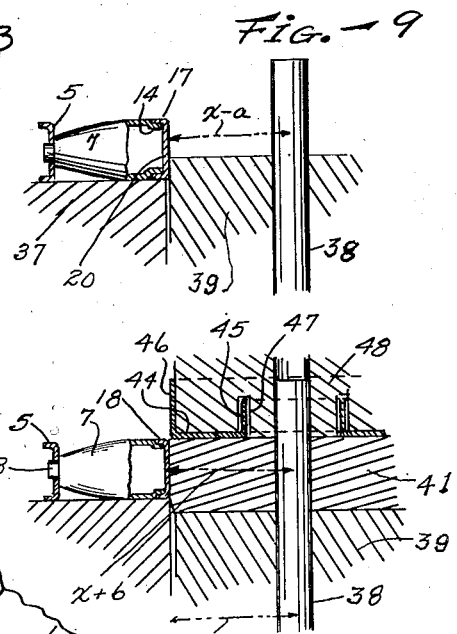
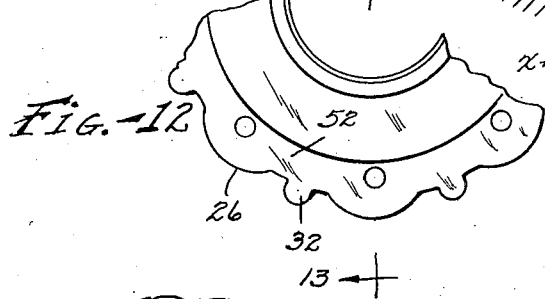
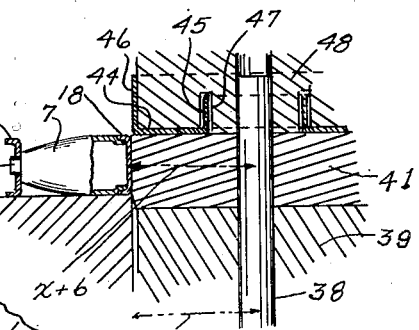
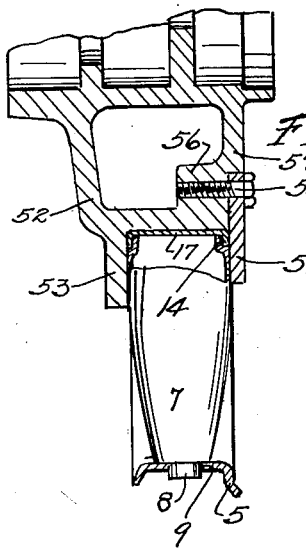
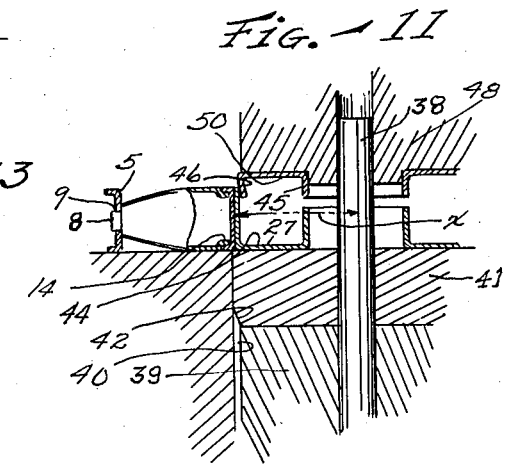
Inventor
ERNEST H. ARNOLD
By Frank D. Gray
Attorney Patented Sept. 8, 1936

2,053,648

UNITED STATES PATENT OFFICE 2,053,648

METHOD OF MANUFACTURING METAL VEHICLE WHEELS

Ernest H. Arnold, Cleveland, Ohio

Application April 29, 1933, Serial No. 668,609

9 Claims. (Cl. 29—159.03)

This invention relates to improvements in the method of manufacturing metal vehicle wheels. More particularly, it is here proposed to manufacture from metal the wheel parts intermediate the rim and hub by certain drawing, forming and bending operations which shall include drawing the spokes from metal plate to the length of the spoke desired, and finally mounting the inner spoke structure and such intermediate parts upon an inner annulus of metal suitable for mounting directly upon the ordinary standardized hub.

It is an object of my present invention to manufacture the several parts of the wheel without welding operations, and thereby eliminate the undesirable seams resulting from such operations, and to attach the closed rim ends of the spokes to the rim or felloe, by forming suitable integral tenons on the spokes and inserting the tenons in apertures in the rim.

It is a further object of my invention to so form the base of the spokes with integral flange structure whereby the old extreme taper design of metal spokes may be eliminated, while a plurality of cap or shell parts is provided in the wheel assembly to lock the base of the spokes in relative position and under pressure upon the axial parts of the wheel.

It is a further object of my improved invention to lock the spoke bases by an equal number of inner cap members, and thereafter lock all the spokes and base caps into a single wheel unit by an annular and unitary metal member forced by axial movement into radial engagement with the several base caps by a single assembling operation.

With these and other objects in view, as they will appear as the description proceeds, my invention comprises certain novel steps of manufacturing a metal wheel, hereinafter described in the specification, recited in the claims, and illustrated in the accompanying drawings, in which,—

Figure 2 is a central radial section of the finished wheel shown mounted upon a conventional hub construction;

Figure 3 is a detail sectional view on an enlarged scale, the section being taken in the plane indicated on the line 3—3 of Fig. 2;

Figure 4 is a perspective detail view of an annular shell member for encircling a wheel hub at the base of the spokes;

Figure 5 is a detail perspective view of the base end of a hollow steel spoke;

Figure 6 is a perspective view of a casing member to be applied to the base of a spoke;

Figure 7 is an inverted perspective view of the casing member shown in Fig. 6;

Figure 8 is a side elevation of the initial step in assembling of the wheel parts, two spokes being shown attached to the wheel rim;

Figure 1:
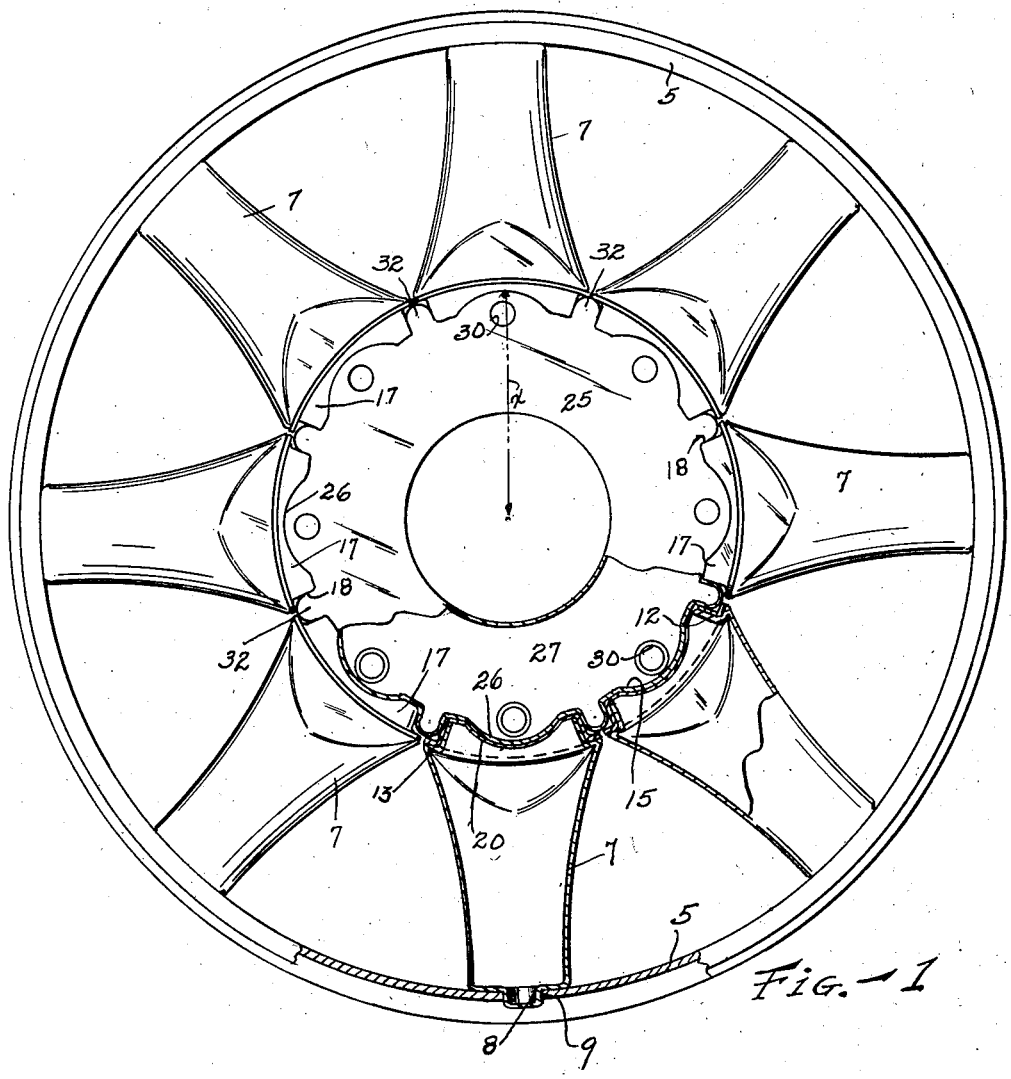
Figure 1 is a side elevation of my improved artillery wheel with parts broken away.

Figures 9, 10, and 11 show, partly in section, successive steps in the operation of assembling the wheel parts by axial movement of a master upon a pilot;

Figure 12 is a detail elevation of a modified form of base construction, here shown as a combined annular member and hub structure adaptable to my improved method, and—

Figure 13 is a radial section of the form of wheel structure shown in Fig. 12, the section being taken in the plane indicated by the line 13—13 of said Fig. 12.

The wheel resulting from my invention and here shown includes parts wholly of metal and hollow; and the method of manufacturing the same is here described as my present invention. While the rim and hub with which my improved parts are designed to be used, are also ordinarily of metal, my present invention is not particularly concerned with improvements in the rim and hub, but for the purpose of illustration of assembly I have shown in Figs. 1, 2, and 8 a rim 5, and in Fig. 2 a hub 6 which are suitable, for mounting between them, my novel wheel structure whose novel steps of manufacture thereof constitute my invention now to be disclosed.

The spoke used in my wheel structure is hollow and is manufactured by drawing from a metal plate to the length of spoke desired, and is designated by numeral 7, a reduced end or tenon 8 being designed to enter an aperture 9 in the rim.

The drawn spokes 7 are shown in various views of the drawings of relatively short length, in conformity with the design of the usual artillery wheel for which great difficulty has been experienced in the past, in providing hollow metal spokes embodying the required strength for resisting the inevitable lateral strains encountered, and at the same time effectively resist the strains of rotation by the driving power of the ordinary hub.

Reference is made to Figs. 1, 3, 5, and 8 in particular, to illustrate the structure of the base of the spokes 7 to be assembled with other parts in steps of my method. As shown in particular detail in Fig. 5, the larger or base end of the spoke is pressed and laterally flared somewhat to provide the end edges 10 and side edges 11, to thereby result in an initial rectangular form of open end at the base, after which the edges of the metal at such open end will be die-pressed to form inclined end flanges 12 integral with laterally bent metal closure plates 13, other portions of the base being formed into parallel side flanges 14 whose outer edges will present a final arc shape as shown at 15, the latter being concave to thereby form sufficient space between their edges and the locking bolts, one of which is designated 16 in Fig. 3.

At this point in its manufacture, the spoke 7 has a closed end with tenon 8 and an open, flanged base end, as shown in Fig. 5 of the drawings, and it is ready for mounting in the rim 5, as shown in Figs. 1 and 8. The next step in the operation of wheel manufacture is, the provision of cap members 17 which are also hollow and metallic, though it is highly preferable to draw them of metal other than steel. They are arc shaped however, and include end flanges 18 and side flanges 19 designed to fit neatly over and outside the flanges 12 and 14 of the spoke bases, the caps being closed by integral curved plate 20 as shown in Figs. 6 and 7.

The entire structure of each cap member 17 is integral, and is drawn to have a form that will fit closely upon the outer surface of the several flanges 12 and 14 of the spoke bases. The curved ends of the plate 20 are integral with the curved edges 23 of the flanges 19, and the cap flanges 18 are integrally connected with the ends of the plate 20 by flat plates 21 whose inner surfaces rest upon the inner edges of the spoke flanges 12. To further strengthen the base structure of the wheel, the caps 17 have outwardly extending integral end plates 22 which when assembled in position, rest upon the closure plates 13 of the spokes 7. The curved edges 33 of the members 17 will rest upon the side shoulders 24 outside the flanges 14.

By my improved method of manufacture, the open base ends of the several spokes are covered by the integral cap member 17 which are securely held upon the spokes by an outwardly exerted pressure radially of each spoke, such cap members having the further purpose of providing an additional metal layer between the spokes and the hub. The outward pressure actuation of the cap members and spokes against the wheel rim 5 is exerted by an annular expanding rim 25 whose outwardly circumferential surface is formed of outwardly bent loops of short radius alternating with curved portions 26 of much longer radius, such expanding rim being integral with a centrally apertured plate 27 whose outer edge 28 is integral with said loops and curved portions. This plate 27 is annular and the rim and its plate may be duplicated, as shown in Figs. 2, 3, 10, and 11, the peripheral flanges or rims 25 being adapted to telescope in the operation of assembly.

Plates 27 are apertured adjacent each portion 26 at 30 to receive the transverse securing bolts 16, as shown in Figs. 2 and 3. These bolts serve to secure the rim part 25 between the hub flange 29 and an annulus 31, if desired, and as shown in Fig. 2.

Since a cap member 17 is applied over the flanged extension at the base of the spoke, it will be evident that when the spoke bases are assembled in closely adjacent relation, and the said extension is somewhat reduced, as shown in Fig. 5, the two plates 13 of adjacent spokes form an approximate base for an open holder of which the inclined flanges 12 of the spoke extensions serve as side walls, in the manner illustrated clearly in Figs. 1 and 3. Into these cells or holders 32, the ends of the cap members 17 extend, the plates 22 resting upon the base 13 of the cell, while the inclined flanges 18 are supported upon the flanges 12 of the spoke bases.

A cap 17 having been applied in the assemblage of the wheel parts, to the base of each spoke, and the rim ends of the spokes having been secured to the wheel rim 5, as shown in Fig. 1, the telescoping expanding rim 25 having the general form of interfitting cups or discs, is now forced axially into a position in the plane of the finished wheel, thereby telescoping such rims at their outer periphery, and at the same time engaging the inner edges of the discs about the central aperture, to form a tubular guide for receiving the hub upon which the wheel will be mounted.

It is an especial feature of my novel construction that the spokes, cap members and rim parts 25 shall be mounted between the wheel rim 5 and the hub to be used, in a very tight relation, and my method of manufacture and assembly is such that all slack between the rim and hub will be taken up in the assembly. Indeed, I am able by my particular improved method to place the several spokes and caps 17 under great compression between the rim structure 25 and the wheel rim 5, before such combined structure is mounted on any hub whatever, a conventional hub 6 being finally inserted in the central aperture 34 of said rim 25.

The hub 6 is shown in Fig. 2 provided with an integral flange 29 having apertures for receiving the bolts 16, and provided with the more or less conventional brake 35 with the apertured plate 36 for mounting upon the hub opposite said flange 29, and having registering apertures through which the bolts may be inserted and tightened for mounting my improved wheel structure upon the hub. No patentable merit is claimed in this case for the hub 6, it being no part of my invention here disclosed.

The method of operation of mounting the spokes, caps and the rim member 25 is believed to be particularly novel and efficient, and will now be described. My method includes the mounting of the spokes in the wheel rim 5 by inserting the tenons 8 in the rim apertures 9, and thereafter applying the before-described cap members 17 upon the base extensions of the several spokes, in the manner disclosed in Fig. 8. The following steps required to mount my wheel parts under strong radial tension include an outward expansion of said caps and spokes in contact with the apertured wheel rim 5, somewhat beyond the limit of radial position that parts 7 and 17 will assume after the centrally apertured rim member 25 has been inserted. Such operation provides a very effective compression between the latter rim and the spoke bases, since a slight recession of the latter radially inward upon the member 25 will be afforded, without requiring axially forced movement of the rim 25 into position in close contact with the cap 17, an operation usually attended with undesirable crushing of the parts.

The above described slightly excessive expansion, by my novel method, of wheel rim, spokes and caps 17 before insertion of the rim member 25, permits release of the wheel parts 5, 7, and 17 radially inward to seat squarely upon the member 25 when the latter has been positioned relative to the spokes in the manner now to be described.

The spoke 7 having been secured radially within the wheel rim as shown in Figs. 1 and 8, and the several cap members 17 having been applied to the base extensions of said spokes, the successive steps of mounting the wheel parts thus far assembled upon the rim member 25, are illustrated in Figs. 9, 10, and 11, the completion of such operation being disclosed in Fig. 1. The wheel rim 5 is shown as mounted in a horizontal plane in Figs. 9, 10, and 11, the spokes 7 being assembled within the rim 5 in the several views, and the cap members 17 applied to the spokes and resting upon a foundation block 37. A vertical pilot or standard 38 may serve to guide the vertical movement of the rim member 25 into position adjacent the base of the spokes, and a master block 39, as operated in my method, is provided and is centrally apertured for moving upon said pilot, such master being shown in Fig. 9 positioned with its upper surface somewhat above the fixed block 37, suitable spring elements being provided beneath said master 39 for normally raising the latter to its upper limit.

As shown in Figs. 9 to 11, the upper peripheral surfaces of the master 39 are somewhat reduced at 40 to render the form of such master slightly frusto-conical and thereby spaced from the block 37. A centrally apertured expander block 41 having the major portion of its peripheral surface cylindrical, is movably guided upon the pilot 38, and the radius of such major portion as measured from the axial center of said pilot, is identical with that of the central aperture of the fixed block 37, which it will be understood is annular, the said central aperture in block 37 having a size adequate for receiving the expander block 41 vertically therein. The lower peripheral surface of the block 41 is tapered conically at 42 to provide a radius of the lower surface of block 41 identical with the upper surface of the master 39.

For convenience in explanation, the radius of the upper or major peripheral portion of the expander block 41 will be assumed to have the value—$X$ plus $b$, and the thickness of the block will exceed that of the wheel rim and spokes as indicated by the relative size of parts shown in Fig. 10. The radius of the upper peripheral portion of the master 39 will then be assumed to be a value indicated by—$X-a$, thereby resulting in a difference of radius between the upper portions of the two blocks 39 and 41, equal in value to—$a$ plus $b$.

The block 39 being normally raised by some pressure exerted underneath, to a height somewhat above the block 37, a very convenient shoulder 43 is presented outwardly from the block 39 against which the several spokes with their caps 17 applied to their bases may be assembled with suitable intervening spaces, the wheel rim 5 being supported upon the fixed block 37, as shown in Fig. 9. In this relative position of parts 17, 7 and 5, the size of rim and spokes will be such as to hold the base of the cap members 17 contiguous with said shoulder 43, but not with a strong, binding force. The radius of said cap member 17, when shown in Fig. 9, is accurately expressed by the expression—$X-a$, said "radius" representing the equivalent of the radius of the reduced portion 40 of the master 39.

The expander block 41 is now positioned above the master 39 and guided upon the pilot 38, and is forced downward against the master block 39, the tapering surface 42 of block 41 first contacting the several base caps 17 and gradually expanding the caps and spokes against the rim 5, until the peripheral surface of the major or cylindrical portion of said expander block 41 has descended to the common upper level of the cap members 17, as shown in Fig. 10.

It is now advantageous to make the next step that of applying the centrally-apertured rim member 25 at the base of the cap members 17 at the same same time exerting the intended expanding force against the caps, and through them and the spokes 7, tightly binding the spokes within the wheel rim 5. The said rim member 25 which is annular in form, comprises the peripheral rim and the plate 27 united at 28 (preferably integral), and such rim structure is preferably duplicated thereby providing the flanged disc members 44 and 50, as shown in Figs. 10 and 11, the shallower annulus 50 meeting the deeper annulus 44 with inner flanges 45 edge to edge, as shown in Fig. 11, while the outer flanges 46 are slightly varied in radius to permit telescoping, as shown in the same view.

It will be understood from the peripheral form of the outer flanges 46, as indicated in Figs. 1, 3, 4, that the curved portions 26 fit neatly in the caps 17, while the loops of short radius are seated in the holders 32. In making this use of the expander rim members 25, the base of the cap members 17 will have the form indicated in Figs. 1 and 8, and the periphery of the blocks 41 and 39 may readily conform to that of the rim members 25, though this is not strictly essential. In any case, the spokes and rim 5 will have been expanded to their intended limit, when the caps 17, spokes 7 and block 41 are positioned in the relation indicated in Fig. 10.

The next step is the insertion of the telescoping expanding rims 25, and it has been found feasible to substitute it for the expander block 41 while the latter withdraws downwardly in super position upon the master 39. The deeper annulus 44 is now seated upon the upper surface of the block 41, while its inner flange 45 is positioned in an annular slot 47 of a downwardly moving plunger block 48, as shown in Fig. 10.

From the relative position of parts in Fig. 10 the block 48 descends carrying the deeper annulus 44 with it, and gradually forcing the blocks 39 and 41 down and substituting the annulus 44 for the expander block 41, the thickness of the metal flange 46 of the annulus 44 together with the radius of the block 48 being an approximate equivalent of the radius of the expander 41—$X$ plus $b$. The upper surfaces of the blocks 37 and 41 will at this time be substantially in the same plane. The shallower annulus 50 will now be presented edge to edge to the annulus 44 in the manner illustrated in Fig. 11, the upper plunger block being chosen for appropriately facing the annulus to be telescoped into final position relative to the annulus 44 so that the inner flanges 45 will assume the form of a continuous tube.

While the expander block 41 is in the position shown in Fig. 10, the caps, spokes and wheel rim 5 will be slightly over-expanded thereby making the insertion of the expanding rim member 25 exceedingly practicable as the block 41 is withdrawn. Assuming the radius of the block 41 as $X$ plus $b$—this indicating the value of the uniform upper portion of said block, and the telescoped annuli 44 and 50 now forming a complete rim 25, the block 48 is removed from the upper surface of the rim 25, and the lower blocks 41 and 39 are wholly removed from below, out of contact with such expanding rim 25, while the outer wheel parts 7 and 17 are permitted to radially engage the final and complete rim 25, as shown in Fig. 2.

Since the reduced upper end 40 of the master 39 has a radius permitting the assembling of the caps 17 and spokes 7, within the rim 5 contiguous with the surface 40, in the position shown in Fig. 9, a subsequent expansion of the parts 7, 17, and 5 by the forced insertion of the block 41 when the master 39 descends, results in a radius of the expanding rim 25 to a value $X$ plus $b$— when succeeding the master block.

It will therefore be clear that the parts 17, 7 and 5 when expanded by the block 41, will have the position shown in Fig. 10; and that the radius of the plunger block 48 enlarged by the thickness of the flange 46 of the annulus 44 carried by said plunger has a value reduced by the value of "$b$", so that when the annulus 44 is substituted for the expander block 41, as shown in Fig. 11, the radius of the annulus 44 will then have a value of "$X$". The steps in the operation of inserting the complete rim member 25 which in its complete form is made up of the two annuli 44 and 50 telescoped in the manner indicated in Fig. 11, comprise therefore, assembling the caps and spokes within the wheel rim 5 over a master block having the radius $X-a$, then over-expanding the caps and spokes by the substitution of block 41 for the block 39, for the purpose of effectively preparing the outer wheel structure for the insertion of the rim member 25, and lastly removing the plunger block 48 and forcing the annulus 50 into position, so that the wheel structure 7 and 17 may be released in a direction radially inward into proper and tight engagement against the rim member 25, as shown in Figs. 1, 2, and 11.

The resulting product thus comprising the wheel structure intermediate the rim 5 and the hub which it is intended shall support the wheel herein described, and can so very well be manufactured by the particular method above explained, will have the great advantage over former hollow metal wheels, of tight and secure engagement between contiguous parts, while also possessing the merit of binding together the several parts with uniformity of force at the portions of the wheel, the spokes held forcibly against the wheel rim, the cap members 17 forced against the base of the spokes, and the rim member 25 bound against the caps. The periphery of the rim 25 fits the base of the caps, thereby holding the caps and rim with the spokes against relative rotation.

The axial opening in the rim 25 is a cylinder formed of the meeting flanges 45, and will receive therein a more or less conventional hub 6 which is held against relative rotation with the rim 25 by the bolts 16, as shown in Fig. 2 which are secured in the flange 29 and the bolt holes 30 shown in Figs. 1 and 2. No hub is shown in Fig. 1. The hollow metal rim member 25 which in my method of building a wheel, I mount intermediate the supporting hub and the cap 17 mounted on the spoke bases, is evidently braced laterally by a fixed flange integral with the hub and some form of annular plate which, I have shown in Fig. 2, as an apertured integral portion of a brake member 35, the plate 36 receiving the ends of the bolts and being movably mounted upon the axial portion of the hub.

While in my method of manufacturing the wheel, as shown in the first eleven views of the drawings, the rim member 25 is a part wholly separate from any hub by which it is carried, in Figs. 12 and 13 I have shown a modified form of wheel structure in which the rim and hub might be formed integral and is designated by the numeral 52. In the latter form the parts 5 and 7 to 24 will be mounted by a method substantially identical with the manner indicated in the preferred form. Die blocks may be used in this form for expanding the caps and spokes, before applying the annulus 54. This will therefore result in about the same method as in the preferred form requirement.

My present improvement in the method of manufacturing wheels as above described, assumes the prior provision of apertured wheel rims to which the closed end of spokes is to be attached, and a hub to which my wheel structure is to be removably secured. The great difficulty before experienced in the art, in securely binding the spokes in proper position to the wheel rim, and at the same time mounting rigidly the base end of the spokes upon the hub, is fully recognized, and my novel method of building intermediate structural parts that shall be hollow and metallic and at the same time disclose a highly practicable method of mounting the parts rigidly in the wheel, is the resulting improvement now presented.

I have so mounted these intermediate metal parts to provide the greatest number of layers of metal possible, between the base end of the spoke and the hub to be used, thereby reinforcing the structure of the portions of the wheel requiring the maximum strength, and I desire to claim broadly such novel method of such novel parts and assembling them with the greatest rigidity.

What I claim and desire to secure by Letters Patent is,—

1. The method of making an all metal vehicle wheel comprising drawing a series of metal tubular spokes, each from a metal plate to the length of spoke desired, the inner open ends being reduced to form integral base extensions mounting a series of drawn metal tubular spokes in a wheel rim, mounting hollow cap members having integral transverse metal plates, upon said base extensions, one for each, to close the said open ends, expanding the said cap member and spoke structure radially outward against the wheel rim, inserting a hollow and annular metal rim within said series of cap members and in the plane of the wheel, releasing such expansive force to permit the base of the cap members to seat directly upon said annular rim, and mounting the latter upon a wheel hub.

2. The method of making an all metal vehicle wheel comprising drawing a series of metal tubular spokes, each formed from a metal plate, the inner open ends being reduced to form integral base extensions mounting a series of drawn metal tubular spokes in a wheel rim, the inner open ends of such spokes being reduced, mounting hollow cap members having integral transverse metal plates, upon said base extensions, one for each, to close the said open ends, expanding the said cap member and spoke structure of the series radially outward against the wheel rim slightly beyond the size essential for final mounting of an axial member within the base surfaces of the cap members, positioning a hollow and annular metal rim within the bases of the caps and in the plane of the wheel, releasing such expansive force to permit the seating of the caps upon said annular rim, and mounting the latter upon a wheel hub.

3. The method of making an all metal vehicle wheel structure for mounting on a hub, comprising mounting a series of elongated, tubular and spaced metal spokes in a wheel rim, the inner open ends of such spokes having integral base extensions, mounting hollow cap members upon said base extensions, one for each, to close the said open ends, mounting said cap members and spokes tightly upon a hollow and annular metal rim including the operation of expanding the cap and spoke structure of the series radially outward beyond the size essential for receiving therein said annular rim, inserting the latter axially in the plane of the wheel, and releasing such expansive force to permit the cap members to be tightly seated upon said annular rim.

4. The method of making an all metal vehicle wheel comprising drawing from a metal plate a tubular spoke, mounting a series of tubular spokes in a wheel rim, the inner open ends of such spokes being reduced transversely to form integral extensions, mounting hollow cap members having transverse metal plates transverse of said extensions, one for each, to close the said open ends, over-expanding the cap and spoke structure outwardly against the wheel rim, positioning a hollow and annular metal rim within the bases of the caps and in the plane of the wheel, and releasing such expansion to permit fixedly seating the caps upon said annular rim.

5. The method of making an all metal vehicle wheel comprising drawing tubular and elongated spokes from a metal plate for each, and reducing the inner open ends of the spokes to form frusto-pyramidal extensions, mounting tubular spokes in a wheel rim, the inner open ends of such spokes being formed and pressed into rectangular cross sectional shape, and the open base ends of such rectangular portions being reduced transversely to form integral open extensions of frusto-pyramidal outline, mounting hollow, closed cap members of similar outline upon said extensions, one for each, over-expanding the cap and spoke structure against the wheel rim and positioning an annular rim in the plane of the wheel contiguous with the bases of the caps, the latter rim having a peripheral outline fitting the entire series of cap members while the latter are so expanded, and releasing such expansion to permit fixedly seating the caps upon said annular rim.

6. The method of making a metal vehicle wheel comprising mounting a series of elongated tubular and spaced metal spokes in a wheel rim, the inner open ends of such spokes having integral base extensions, mounting hollow closed cap members of similar transverse outline upon said extensions, one for each, overexpanding the cap and spoke structure and positioning in the plane of the wheel an annular rim within the caps while the latter are so expanded, and releasing such expansion to permit fixedly seating the caps upon said annular rim.

7. The method of making a metal vehicle wheel comprising drawing tubular and elongated spokes from a metal plate for each, and reducing the inner open ends of the spokes to form integral, frusto-pyramidal extensions, mounting tubular spokes in a wheel rim over expanding the entire spoke structure radially outward, positioning in the plane of the wheel an annular rim within said extensions while the latter are so expanded, and releasing such expansion to permit fixedly seating the spoke extensions upon said annular rim.

8. The method of making an all metal vehicle wheel comprising drawing tubular and elongated spokes from a metal plate for each, pressing the inner open ends of such spokes into rectangular form in cross section, and reducing the open base ends of such rectangular portions transversely to form integral open extensions of frusto-pyramidal outline, mounting tubular spokes in a wheel rim, over expanding the said spoke structure including their extensions, against the wheel rim, positioning an annular hollow rim in the plane of the wheel, said annular rim having a peripheral outline fitting the entire series of base extensions while the latter are so expanded and releasing such expansion to permit fixedly seating said extensions upon said annular rim.

9. The method of making an all metal vehicle wheel comprising drawing from metal blanks tubular spokes having inner open ends reduced to form integral base extensions, drawing from blanks hollow cap members formed to cover said base extensions, one for each, mounting a series of such spokes in a wheel rim, mounting at the base of said cap members, and in the common plane of the wheel, a hollow and annular rim of adequate radius relative to the length of the spokes to exert radial and outward pressure against the cap members and spokes, to take up any slack between the annular and wheel rims, and fixedly mount the annular rim on a wheel hub.

ERNEST H. ARNOLD.